United States Patent [19]

Nosker

[11] 4,330,881
[45] May 18, 1982

[54] VIDEO DISC APPARATUS FOR CLEARING FOREIGN MATTER FROM THE SIGNAL PICKUP STYLUS DURING PLAYBACK

[75] Inventor: Richard W. Nosker, Princeton, N.J.

[73] Assignee: RCA Corporation, New York, N.Y.

[21] Appl. No.: 128,234

[22] Filed: Mar. 7, 1980

[51] Int. Cl.³ .............................................. G11B 3/58
[52] U.S. Cl. ....................................... 369/50; 369/71; 369/72; 369/126
[58] Field of Search .................. 274/47; 179/100.1 G, 179/100.3 V; 360/137; 358/128.5, 128.6; 346/69

[56] References Cited

U.S. PATENT DOCUMENTS

| | | |
|---|---|---|
| 1,335,352 | 3/1920 | Slowey . |
| 2,310,275 | 2/1943 | Beebe . |
| 2,955,825 | 10/1960 | Staar . |
| 3,162,445 | 12/1964 | Henry . |
| 3,266,807 | 8/1966 | Antwerp . |
| 3,731,317 | 5/1973 | deBruyne .......................... 346/69 X |
| 3,881,734 | 5/1975 | Leedom . |
| 4,080,625 | 3/1978 | Kawamoto et al. . |
| 4,166,623 | 9/1979 | Nanbu et al. . |
| 4,173,348 | 11/1979 | Dholakia ............................. 274/47 |

OTHER PUBLICATIONS

J. K. Clemens, "Capacitive Pickup and the Buried Subcarrier Encoding System for the RCA Video Disc", *RCA Review*. vol. 39, Mar. 1978, pp. 33-59.

*Primary Examiner*—Bernard Konick
*Assistant Examiner*—Donald McElheny, Jr.
*Attorney, Agent, or Firm*—E. M. Whitacre; J. S. Tripoli; E. P. Herrmann

[57] ABSTRACT

Accumulated foreign material on the signal pickup stylus of a video disc player tends to degrade the quality of the recovered information signal. The recovered information signal is detected and the nominal amplitude of the recovered signal is compared against a reference amplitude. The occurrence of a decrease in recovered signal amplitude below the level of the reference causes a comparator to generate a control or trigger pulse. The control pulse activates a pulse generator to produce a predetermined pulse sequence which is applied to a stylus deflection transducer to move the stylus fore and aft radially across the disc and thereby dislodge the foreign material from the pickup stylus.

7 Claims, 9 Drawing Figures

VIDEO DISC APPARATUS FOR CLEARING FOREIGN MATTER FROM THE SIGNAL PICKUP STYLUS DURING PLAYBACK

The present invention relates to video disc playback systems and in particular to apparatus for removing accumulated foreign matter from a signal pickup stylus during playback.

Certain video disc systems employ disc records on which information is recorded in the form of geometric variations along a signal track. The recorded information is retrieved from the disc record by a playback stylus engaging the disc record when relative motion is created therebetween by rotating the disc. These stylus-disc playback systems exist in various forms, e.g., some systems utilize grooved disc records wherein the pickup stylus is constrained to follow the information track by the groove walls while other systems employ grooveless records with the pickup stylus being maintained proximate the information track by a servo system responsive to tracking information recorded on the record adjacent the information track. Further variations exist in the grooved disc type systems. A first type, the capacitive systems, respond to temporal capacitance changes between the stylus and the disc record while a second type, the pressure-sensitive systems, generate signals as a result of motion induced in the stylus per se in accordance with the geometric variations in the groove normal to the direction of relative velocity between the stylus and the disc.

Each of the foregoing types of systems are subject to performance degradation as a result of foreign matter accumulating on the pickup stylus. The foreign matter may be dust, moisture, a residue from disc wear after repeated play, etc., and tends to adhere to the stylus. Accumulations of such foreign matter hamper stylus tracking ability in the grooved disc systems, affect the relative stylus-disc capacitance in the capacitive pickup systems, and tend to diminish motion induced in the stylus by the geometric variations in the pressure sensitive systems. The ultimate affect is an undesirable degradation in the reproduction of the recorded information when in the form of a video display or erroneous data when the disc is utilized for data storage. It is desirable to remove the foreign matter from the pickup stylus with a minimum of playback disturbance preferably without visibly interrupting a video display.

In accordance with the present invention the signal recovered from the disc record is monitored to detect particularized signal degradations and upon the occurrence of such particularized degradation to activate a transducer to cause the stylus to skip forward and backward radially across a number of information tracks on the disc. Abrupt momentum changes of the stylus as well as increased abrasion and increased pressure between stylus and disc incident to the stylus skips tend to dislodge and clear the accumulated foreign matter from the stylus and restore the retrieved signal level to acceptable conditions. The radial forward and backward skipping results in motion conducive to dislodging debris from the stylus as well as having the stylus return to a position proximate the point it was first deflected. The pickup stylus deflections may be conditioned to occur during the video vertical blanking periods, so that little or no disturbance will occur in the playback display.

Figure 1:
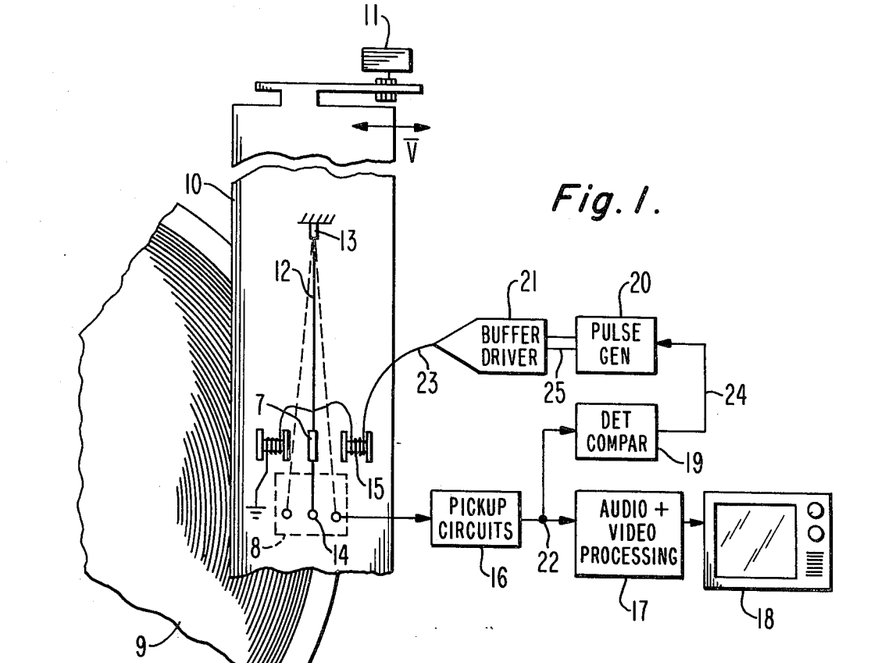
FIGS. 1 and 6 are partial schematic, partial block diagrams embodying respective systems for inducing alternate stylus deflections in response to signal amplitude degradation and data errors.

In FIG. 1, a carriage assembly 10 supports and translates a signal pickup stylus 14 across a disc record 9. The pickup stylus 14 engages the disc record through aperture 8 in the carriage and the carriage is translated by motive means 11. The pickup stylus 14 is mounted to the free end of a rigid stylus arm 12, the second end thereof being secured to the carriage by the compliant coupler 13. The coupler 13 permits relatively free movement of the pickup stylus at least in the direction of movement of the carriage designated V in the Figure.

A transducer for inducing motion of the stylus relative to the carriage and the disc record is included in the carriage assembly. The transducer is exemplified in FIG. 1 by a pair of coils 15 secured to the carriage assembly on either side of the stylus arm. A magnetic element 7 is secured to the stylus arm and disposed between the coils 15. Energization of the coils by a current passed via conductor 23 generates a magnetic flux in the area between the coils sufficient to move the element 7 and thereby deflect the stylus arm 12 and stylus 14 to which it is secured. The direction of the stylus deflection is determined by the polarity of the applied energization current.

The pickup stylus 14 cooperates with the disc record 9 and signal pickup circuitry 16 to recover the prerecorded information on the disc. For an example of the capacitive type video disc systems, see J. K. Clemens', "Capacitive Pickup and the Buried Encoding System for the RCA Video Disc", RCA Review Vol. 39, No. 1, Mar. 1978, pp. 33–59 and U.S. Pat. No. 4,080,625 entitled, "Pickup Circuitry for a Video Disc Player with Printed Circuit Board", issued Mar. 21, 1978 to H. Kawamoto et al and assigned to RCA Corporation. The recovered signals available from the pickup circuitry 16 at connection 22 are conditioned by the audio and video processing circuitry 17 for application to the antenna input terminals of a typical television receiver 18.

The signal available at connection 22 may be amplitude modulated or phase or frequency modulated depending on the particular system. For descriptive purposes a capacitive disc system will be assumed and the signal at connection 22 will be presumed to be frequency modulated or FM, having a nominal constant amplitude. Buildup of foreign material on the pickup stylus tends to decrease the absolute disc-stylus capacitance reducing temporal disc-stylus capacitance variations representing the recorded information. This reduction in temporal capacitance variations is manifested by a reduction in the amplitude and the quality of the FM signal.

The signal at connection 22 is applied to circuitry 19 where it is detected, for example, by a peak detector and then compared against a reference potential. When the detected signal falls below the predetermined reference, which is set at some percentage of the nominal detected amplitude, the output signal from circuitry 19 exhibits a transition for controlling circuitry 20.

The above-described detection circuitry is acceptable for systems having very uniform interdisc-stylus parameters, i.e., systems wherein the amplitude of the signal at connection 22 does not vary significantly when discs or styli are interchanged and where the signal amplitude is nominally constant across each disc. However, it has been recognized that for disc-stylus interchanges the amplitude may vary by as much as 10:1. Such a variation precludes the use of a fixed reference for comparing the detected signal. It is therefore necessary that the circuitry 19 automatically adapt to the nominal amplitude of each stylus-disc combination and detect relative changes in the signal amplitude.

Figure 2:
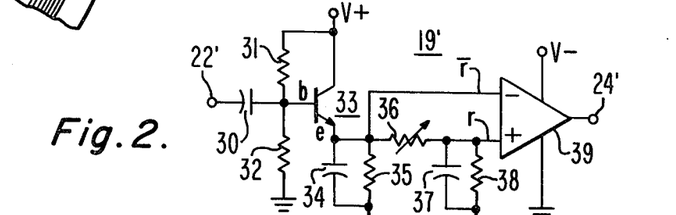
FIG. 2 is a schematic diagram of a circuit for generating a control signal responsive to a diminished signal amplitude occurring for a prescribed duration.

The circuit shown in FIG. 2 amplitude detects the signals applied to its input terminal 22', and self-calibrates to generate a potential transition at its output terminal 24' responsive to a predetermined average amplitude degradation lasting for a predetermined duration. In the circuit, transistor 33 is connected as an emitter follower. Application of signal potential to its base electrode is translated to its emitter electrode less a base-emitter forward potential drop. Resistors 31 and 32 bias the base of tansistor 33 to some value such that an AC signal appearing at input terminal 22' will influence the transistor 33 emitter current. Capacitor 30 serves to isolate terminal 22' from the DC potential at the base electrode and couples AC signals from terminal 22' to the transistor base connection. Consider the circuit to be in the steady state, i.e., a nominally constant amplitude FM signal is applied to input terminal 22'. The positive peaks of the FM signal forward bias the base emitter junction of transistor 33 to charge capacitor 34. Negative swings of the FM signal reverse bias the base-emitter junction thereby turning transistor 33 off. On every negative half cycle of the FM signal the charge on the capacitor 34 begins to leak off or discharge through resistor 35 and the potential at the emitter electrode decays with a time constant determined by R35 and C34, the resistance and capacitance values of 35 and 34 respectively. The resistance of resistor 36 is large compared to the resistance of resistor 35, hence current flow through resistor 36 is not significant. The time constant R35, C34 is made long compared to the cycle time of the input FM signal so that only a small percentage of the charge leaks off the capacitor for each negative half cycle of the input signal, and the potential at the emitter electrode approximately follows the peak level of the input signal. The emitter-base junction and the resistor 35-capacitor 34 combination therefore perform an amplitude detection function.

If the amplitude of the input signal diminishes by an amount greater than the potential decay on the capacitor associated with a negative half cycle, subsequent signal peaks will be insufficient to forward bias the base-emitter junction of transistor 33 and the capacitor 34 will continue to discharge until the potential at the emitter drops to a level that is one base-emitter potential drop below the peak input signal and the potential at the emitter will stabilize at this level. The potential level at the emitter can readily follow increases in the amplitude of the input signal but is constrained to follow decreases at a rate established by the R34, C34 time constant.

The resistors 36 and 38 form a voltage divider to divide down the voltage provided at the emitter by the ratio of R38/(R38+R36), where R38 and R36 are the resistance values of resistors 38 and 36 respectively. This voltage is applied as a reference potential at the noninverting input terminal r of differential amplifier 39. The capacitor 37-resistor 38 combination establishes the decay rate for negative potential changes at r, which rate is long relative to the time constant R35, C34 associated with the emitter electrode of transistor 33. The potential at r is slow to respond to changes in potential at the emitter and establishes the long term or nominal reference level in accordance with the input signal level of a particular stylus-disc combination. This is a self-calibrating or automatic reference generation feature.

Figure 5:
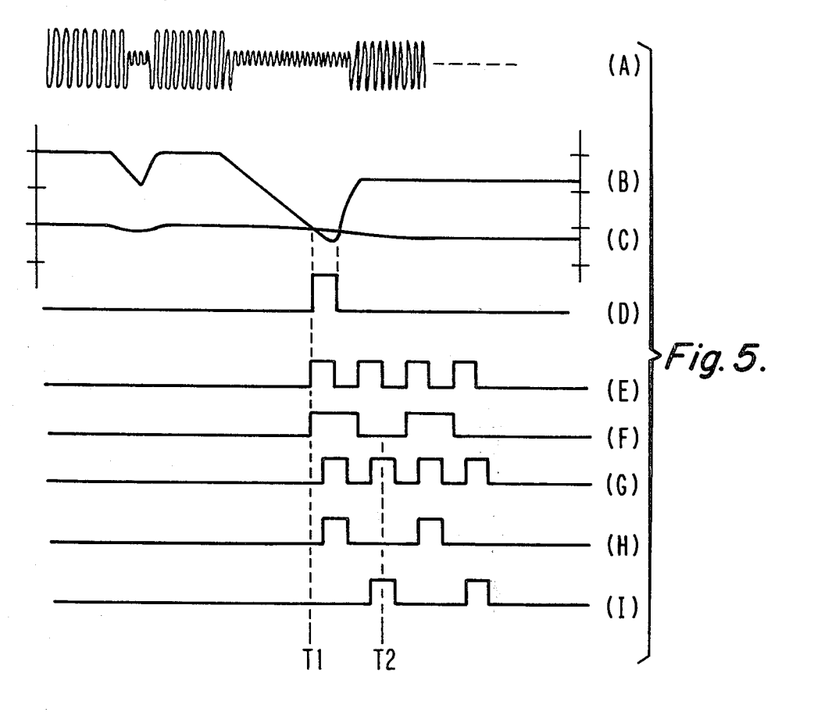
FIG. 5 is a waveform diagram of the potentials occurring at various nodes in FIGS. 2–4.

The inverting input terminal $\bar{r}$ of differential amplifier 39 is connected to the emitter of transistor 33 and therefore follows the average peak signal applied to the input 22'. Referring to FIG. 5, waveform (A) is an FM signal which is subject to amplitude degradation and is coupled via terminal 22' to the base of transistor 33. This signal is rectified or detected by the transistor base-emitter junction and appears at the emitter as a slowly varying DC signal (waveform (B) The amplitudes of waveforms (B) and (C) are exaggerated in the drawing). The emitter potential cannot follow abrupt negative changes in the AC signal amplitude of short duration because of the R35, C34 time constant and therefore decays to the new, lesser peak amplitude. The potential decay at the emitter, however, is much more rapid than the decay at terminal r (waveform (C)) allowing the inverting input terminal $\bar{r}$ of amplifier 39 to become more negative than the non-inverting input terminal r of amplifier 39 (time T1) and thus causes the amplifier output potential at terminal 24' to swing from negative saturation to positive saturation (waveform (D)) thereby generating a control signal.

Referring again to FIG. 1, the control pulse from circuitry 19 is applied to a pulse generator 20. Pulse generator 20 creates a predetermined sequence of pulses to cause alternate deflections of the stylus 14 by the deflection transducer. The output pulse sequence from generator 20 is applied to buffer/driver 21 which buffers and/or conditions the waveform for application to the deflection transducer.

It is advantageous to include a means to inhibit the predetermined sequence of pulses once the signal degradation has been eliminated or after a minimum number of pulses. This may be accomplished for example by employing the control signal to inhibit the pulse generator after the control signal returns to its normal state and the predetermined minimum number of pulses occurred. It is also advantageous to inhibit the corrective action after a predetermined maximum number of pulse sequences, because it is either impossible to remove the foreign matter or else because the loss of signal is probably due to other causes.

Figure 4:
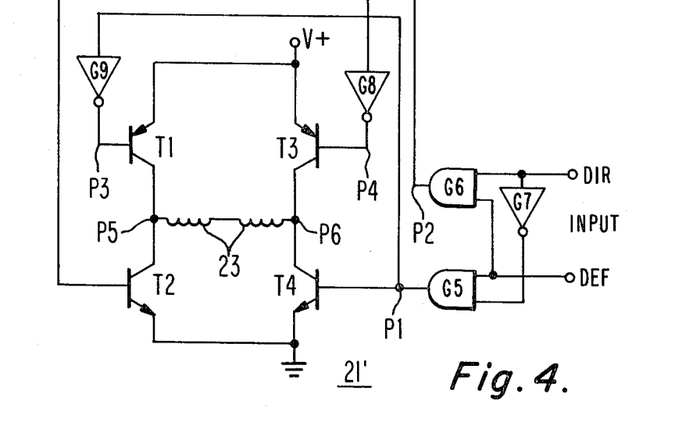
FIG. 4 is a schematic diagram of circuitry for energizing the pickup stylus deflection transducer.

In the embodiment shown wherein the transducer comprises a magnetic element between a pair of coils, deflection in alternate directions is effected by applying current to the coils in opposite directions. However, in the relaxed condition, when the transducer is inoperative, no current should flow in the coils to bias the magnet. FIG. 4 illustrates a bridge type driver circuit capable of directing current of either polarity through transducer coils 23 and for preventing current from flowing in the coils during non-deflecting periods. In the Figure, signals from gate G5 at connection P1 are applied to transistor T4 and the complement of the signals at P1 are applied to complementary transistor T1. A logic "high" at P1 will cause both T1 and T4 to conduct directing current through transducer coils 23 in a direction from point P5 to point P6. A logic "low" at P1 will cause both transistors T1 and T4 to be biased off. Similarly a logic "high" at connection P2 will cause transistors T2 and T3 to direct current through coils 23 in a direction from point P6 to point P5 and a logic "low" at P2 will bias transistors T2 and T3 off. Gates G5, G6 and G7 are arranged to permit only one of the connections P1 or P2 to be at a logic "high" at a particular time. Gate G6 (gate G5) will produce a logic "high" at its output terminal P2 (P1) only for a logic high applied simultaneously to both of its inputs. Thus if the input designated DIR is "high" and a "high" pulse occurs at the terminal designated DEF, the logic state at P2 will be "high" coincident with the pulse. Note that gate G7 is a simple inverter which complements the logic signal at terminal DIR and applies it to gate G5. Thus it is not possible for both G5 and G6 to simultaneously have logic "high" signals on both of their respective input terminals. Referring to FIG. 5, waveform (F) applied to the DIR terminal and waveform (G) applied to the DEF terminal will produce the pulse sequence of waveform (H) at P2 and the sequence of waveform (I) at P1. For example, at time T2, the logic state of DIR is "low" thus the output P2 of gate G6 must be "low". Gate G7, however, complements the DIR signal causing a first input terminal of gate G5 to be "high" while simultaneously the DEF signal is "high" satisfying the conditions for the output terminal P1 of gate G5 to be "high". The waveforms (H) and (I) occurring at P2 and P1 respectively cause the transistor pairs T1, T4 and T2, T3 to alternately conduct and direct current alternately in opposite directions through the transducer coils to induce alternate forward and backward skips or deflection of the stylus in a radial path on the disc.

Figure 3:
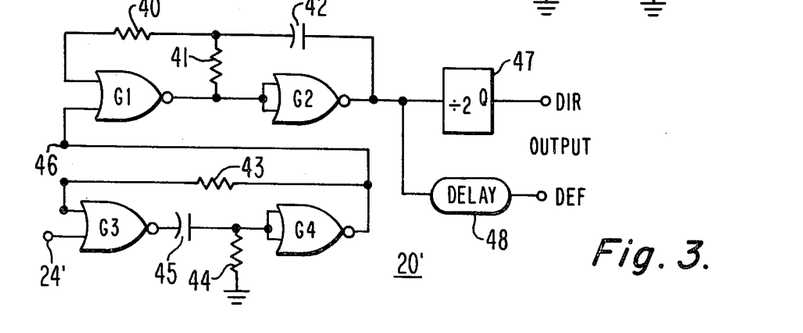
FIG. 3 is a schematic diagram of circuitry for generating a pulse sequence responsive to a control pulse transition.

The particular pulse sequences depicted in waveforms (F) and (G) are generated by the FIG. 3 circuit. In the drawing, gates G3 and G4 interconnected with resistors 43 and 44 and capacitor 45 comprise a monostable multivibrator or one-shot for generating a single pulse of predetermined duration at connection 46, in response to a pulse of arbitrary duration at input terminal 24'. The pulse applied to connection 46 conditions the astable multivibrator comprised of gates G1, G2, resistors 40, 41 and capacitor 42 into free running oscillation for the requisite duration to produce the desired number of pulses at connection 49, e.g., waveform (E) in FIG. 5. This waveform is counted down or divided by two by the circuit 47 and applied to the output terminal designated DIR, waveform (F). The signal at connection 49 is concurrently delayed by circuit 48 and applied to the output terminal designated DEF, waveform (G). Delaying the signal at connection 49 positions or centers the particular DEF pulses within the particular DIR pulses. For a detailed description of the operation of the monostable and astable multivibrator circuits, see J. A. Dean, et al, "Astable and Monostable Oscillators Using RCA COS/MOS Digital Integrated Circuits", RCA Application Note ICAN-6267, RCA COS/MOS Integrated Circuits DATABOOK, SSD250, 1977, pp. 623–626.

Figure 6:
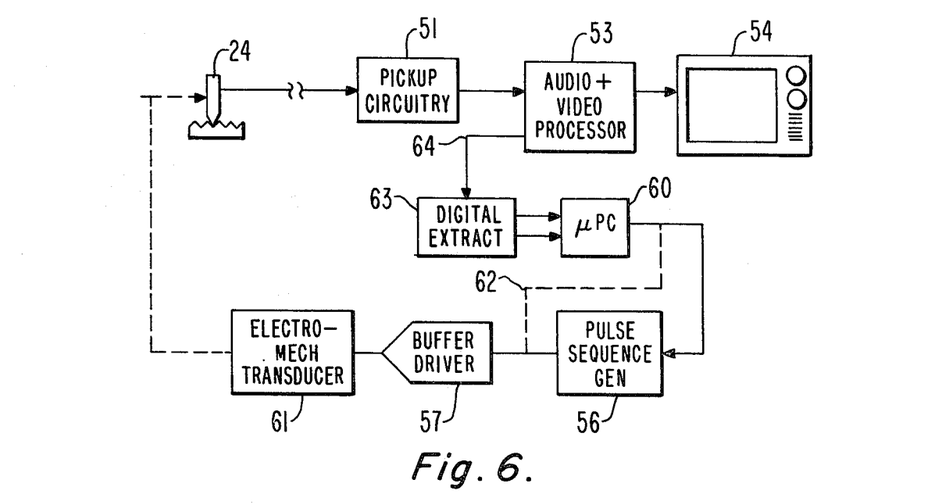

Certain disc record systems include track identification information interspersed in the prerecorded information. This information is typically coded in digital format and typically occurs proximate the vertical blanking synchronizing signals for each video field or each video frame of information stored on the disc. Where these signals are present, digital means may be employed for determining signal degradation to initiate the stylus clearing procedure. The system of FIG. 6 comprises apparatus for determining when an unacceptable number of erroneous digital identification numbers have occurred in a given time interval and, pursuant thereto, the apparatus produces a control pulse to generate pulses for deflecting the stylus as in the foregoing amplitude detection system. In the figure, circuit elements 51, 53, 54, 56, 57 correspond respectively to elements 16, 17, 18, 20, 21 in FIG. 1. Element 63 extracts the digital information from the recovered signal and applied it to the digital processing circuit 60, e.g., a microprocessor. The processing circuit compares the last-most identification number with previous numbers to determine whether the lastmost number is correct and if not, to respond on the occurrence of a predetermined number of erroneous identification numbers by triggering the pulse sequence generator 56. Consider, for example, a video disc in which information is recorded in a generally NTSC format having vertical and horizontal blanking intervals. Normally, the first 21 horizontal lines of each field of display contain no usable video information, thus that portion of a field may be used to contain track identification information. If there exist more than one field per track or convolution, and the fields are radially aligned from track to track so that each field of a track defines an angular sector of the disc, both track and sector information may be included. By way of example consider a record disc having a spiral groove with eight fields per convolution, the fields from convolution to convolution being aligned in eight 45 degree sectors. The fields in a convolution may be sequentially identified by a three bit digital code, and the convolutions may be sequentially numbered by a further digital code. Simply by checking whether a particular identification number, inclusive of convolution number and field or sector number, follows a normal progression it may be determined whether or not there has been an occurrence of a probable error. A microprocessor equipped with an appropriate memory is suited to this task in that it can store a sequence of numbers and make a number of comparisons, per recovered identification number to decide if an error occurred in recovery of the signal. However, the calculating circuitry 60 is not limited to that of a microprocessor.

It is not desirable to trigger a stylus cleaning sequence on detection of a single error as the error may be anomalous and not the result of signal degradation. Nor is it desirable to require that a particular number of consecutive errors occur before initiating stylus action since the reproduced picture may become unacceptable before this happens. It was found that initiating stylus clearing dependent upon an average number of errors for a given number of possible errors produces a more pleasing reproduced video display.

Figure 8:
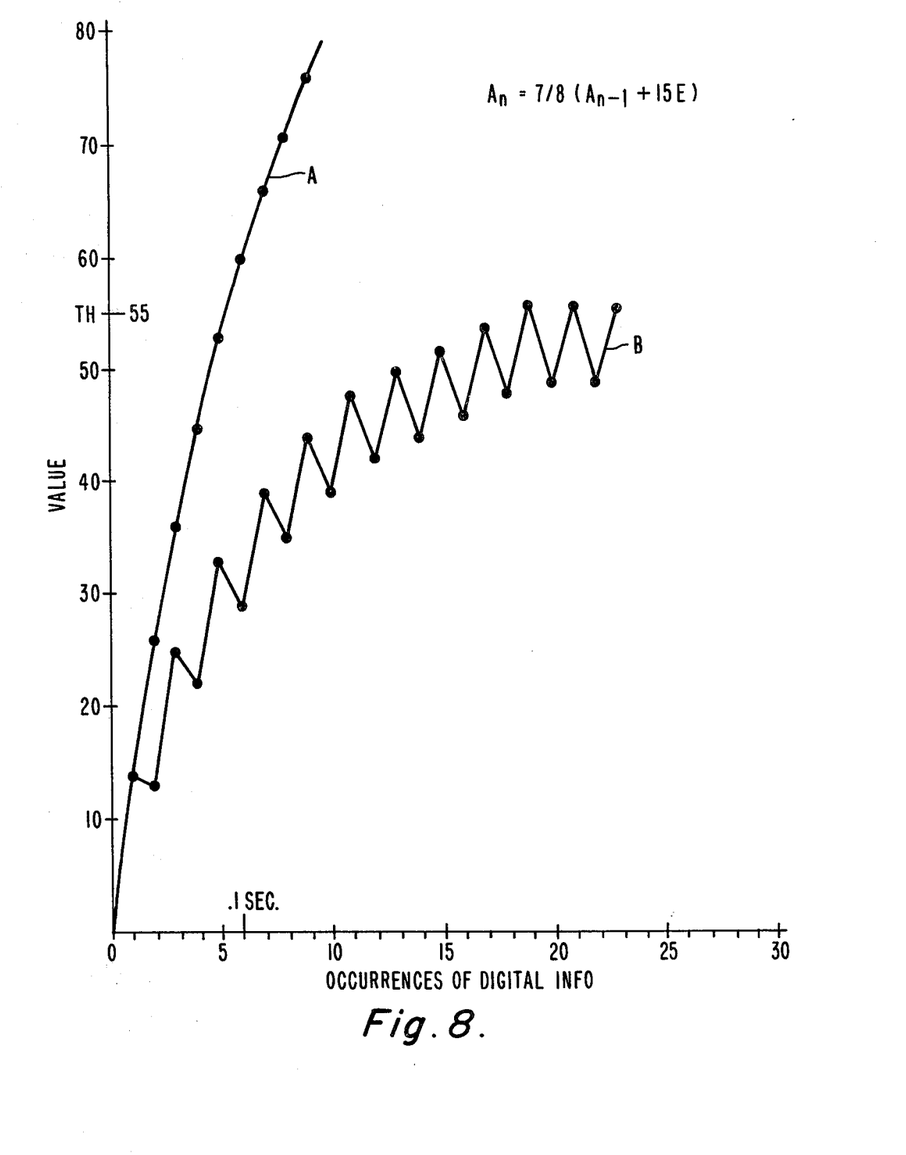
FIG. 8 is a graph of the value of the accumulated error calculated per the FIG. 7 flow chart.

A particular averaging function which is conveniently implemented in a microprocessor based system is given by the formula $$A_n = 7/8(A_{n-1} + kE) \qquad (1)$$

where $A_n$ is a discrete digital function calculated once each time data is read out and represents a weighted average error signal over a continuously sampled set of data, $A_{n-1}$ is the value of the function calculated for the previous data readout, k is a scaling factor and E is equal to one if the identification number is in error and equal to zero otherwise. FIG. 8 is a graph of the function for the case of consecutive errors (ones) and for alternate errors (one-zero-one etc.) with a velue of 15 assigned to the scale factor k. Given a system where every video field has an identifying number, k=15 and a threshold of 55 is chosen, a control pulse will result in apporoximately 0.1 sec. for consecutive errors and 0.3 sec. for alternate errors.

Figure 7:
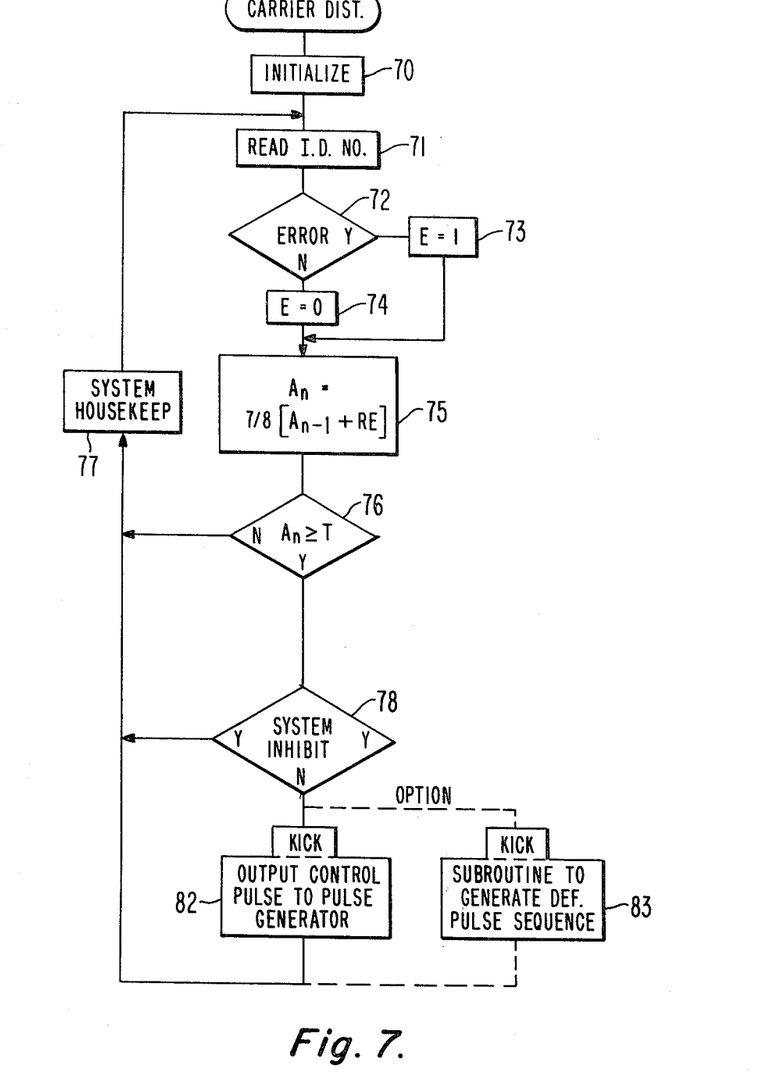
FIG. 7 is a flow chart exemplifying the operation of the circuit of FIG. 6.

The sequence of events iterated by the microprocessor (μpc) to generate a control pulse to initiate stylus clearing is illustrated in the flow chart of FIG. 7. When the system is put in operation it is initialized (76) to the present stylus location, $A_{n-1}$ is assigned a value, etc. The μpc is alerted that an identification number is present and is directed to read that number (71). The number is checked for possible errors (72) and if an error is detected E is assigned a value of "one" (73) or else a value of "zero" (74). The function $A_n$ is calculated (75) with the resultant value compared with a predetermined threshold value "T" (76). If $A_n$ is greater than or equal to the threshold a check is made to see if the system is already in a stylus clearing mode or under control of some other system inhibit to prevent a current stylus kick (78). This situation would exist if the player were in the fast scan or reverse play mode, etc. On the condition that $A_n$ is less than "T" or greater than "T" and the system is in an inhibit mode then the μpc sequences to a housekeeping function (77) wherein parameters are updated and ancillary functions are performed with the system returning to the read mode when a subsequent identification number is available. If $A_n$ is greater than or equal to "T" and there are no system inhibits, a control pulse is generated (82) to trigger the pulse sequence generator 56, or the μpc may be programmed to generate the pulse sequence directly (83) and apply the sequence to the buffer/driver 57. Note the foregoing flow diagram was arbitrarily chosen for illustrative purposes.

Figure 9:
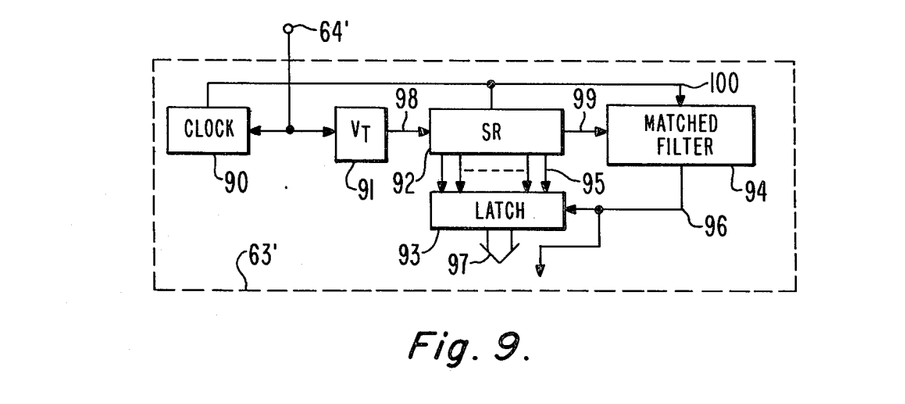
FIG. 9 is a block diagram of a system for extracting a digital identification signal from the recovered video signal.

FIG. 9 is illustrative of apparatus for performing the extraction of digital information from the recovered signal. The operation of this apparatus is as follows. Again assume that the signal is recorded in a generally NTSC format and that a digital identification signal, inclusive of an N bit recognition code followed by an M bit field identification number is present on the 17th horizontal line of each field. The M bit field identification number identifies the track convolution and the sector, and the N bit recognition code is used to alert the system that the subsequent M bits comprise useful data, e.g., track numbers. Assume that the maximum bit rate is equal to and synchronized with a fundamental system frequency such as the color burst frequency. Clock 90 oscillates at a substantially constant frequency equal to the requisite fundamental frequency and synchronized therewith and has an output signal suitable for driving logic circuitry. Demodulated video signals from the video processor are applied via connection 64' to the clock generator 90 for the purpose of synchronizing the clock and to the threshold detector 91. The threshold circuit conditions the video signal, inclusive of the digital information to a bilevel signal having logic level amplitudes commensurate for inputting signals to shift register 92. The signal from threshold circuit 91 is sequenced by the clock signal at connection 100, through the M bit serial-parallel shift register 92 and into the N bit matched filter 94. When n sequential bits of the signal applied to filter 94 match a recognition signal programmed into the filter, the filter 94 outputs a correlation pulse onto line 96. The following M signal bits concurrently contained in register 92 are the track and sector information bits. M bits of information available from M parallel output connections 95 are latched and formatted for use by the microprocessor by LATCH circuit 93 responsive to the correlation pulse occurring on line 96, and the correlation pulse alerts the microprocessor or calculating means that a valid digital signal is present.

An alternative to the detection of erroneous sequences in the track identification numbers for detecting degradations in the recovered signal may be achieved by simply looking for the absence of correlation pulses from the matched filter. Since the digital sequences occur at regularly spaced intervals, the absence of a correlation pulse in one of those intervals indicates an error has occurred in the recognition code. Errors in the recognition code may be equally indicative of signal degradation as are errors in the track identification numbers. The detection of errors in the recognition code may then be used in generating the control signal for deflecting the pickup stylus.

What is claimed is:

1. In a video disc system of the type wherein prerecorded information is retrieved from a disc record by a signal pickup stylus, said signal pickup stylus being subject to accumulating foreign material thereon during playback, apparatus for removing said foreign material from the signal pickup stylus comprising:
   first means responsive to a predetermined degradation of the recovered information signal for generating a control signal;
   second means responsive to said control signal for generating a predetermined pulse sequence; and
   transducer means operatively coupled to the signal pickup stylus, said transducer being responsive to the predetermined pulse sequence for deflecting the signal pickup stylus in a manner causing the dislodging of said foreign material from the pickup stylus.

2. The apparatus as set forth in claim 1 wherein the first means includes comparator circuitry for comparing the amplitude of the recovered signal with a reference potential, said comparator circuitry producing the control signal whenever the amplitude of the recovered signal decreases to a level less than said reference.

3. The apparatus set forth in claim 1 wherein the signal pickup stylus is secured to the first end of a stylus arm, the second end being compliantly mounted to a stylus translating carriage, and wherein said transducer means comprises:
   a permanent magnet secured to the stylus arm;
   first and second coils for generating a magnetic flux therebetween responsive to the predetermined pulse sequence, said coils being fixedly secured to the translatory carriage such that said permanent magnet is disposed therebetween, said permanent magnet being influenced to move in accordance with the amplitude and direction of the magnetic flux causing a concomitant motion of the signal pickup stylus.

4. The apparatus set forth in claims 1, 2 or 3 wherein said second means is a microprocessor programmed to generate a particular pulse sequence in response to said control signal.

5. The apparatus set forth in claim 1 further including buffer circuitry connected between said second means and the transducer means for conditioning the predetermined pulse sequence to drive the transducer in alternate directions.

6. The apparatus set forth in claim 1 wherein said prerecorded information includes periodic digital identification information for determining the position of the signal pickup stylus on the disc record, and wherein said first means includes:

means responsive to a degradation in the quality of the recovered digital identification information for generating a control signal.

7. The combination comprising:

a video disc player having a signal pickup stylus mounted to the first end of a stylus arm, the second end thereof being mounted to a carriage assembly for translating the pickup stylus radially across a disc record, said pickup stylus engaging the disc record for retrieving a prerecorded signal therefrom, said pickup stylus being subject to accumulating foreign material thereon, said foreign material tending to degrade the signal recovered from the disc record;

first means responsive to a predetermined change in the amplitude of the recovered signal for generating a control signal;

second means for generating at an output terminal thereof a particular pulse sequence in response to the generation of said control signal;

third means connected to the output terminal of the second means for conditioning and buffering the pulse sequence;

a transducer arranged to produce abrupt stylus translations radially across said disc record to positions alternately advanced and retarded from the present play position responsive to the buffered pulse sequence from said third means in order to dislodge foreign material accumulated on the pickup stylus.

* * * * *